US011496735B2

(12) United States Patent
Iwamura et al.

(10) Patent No.: US 11,496,735 B2
(45) Date of Patent: Nov. 8, 2022

(54) IMAGE ENCODING DEVICE, IMAGE DECODING DEVICE AND PROGRAM

(71) Applicant: NIPPON HOSO KYOKAI, Tokyo (JP)

(72) Inventors: Shunsuke Iwamura, Tokyo (JP); Atsuro Ichigaya, Tokyo (JP); Shimpei Nemoto, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

(21) Appl. No.: 17/035,997

(22) Filed: Sep. 29, 2020

(65) Prior Publication Data

US 2021/0014491 A1 Jan. 14, 2021

Related U.S. Application Data

(63) Continuation of application No. PCT/JP2019/014362, filed on Mar. 29, 2019.

(30) Foreign Application Priority Data

Mar. 29, 2018 (JP) .............................. JP2018-065780

(51) Int. Cl.
*H04N 19/119* (2014.01)
*H04N 19/122* (2014.01)
(Continued)

(52) U.S. Cl.
CPC ......... *H04N 19/119* (2014.11); *H04N 19/122* (2014.11); *H04N 19/124* (2014.11);
(Continued)

(58) Field of Classification Search
CPC ...... H04N 19/176; H04N 19/82; H04N 19/52; H04N 19/96; H04N 19/139; H04N 19/17;
(Continued)

(56) References Cited

U.S. PATENT DOCUMENTS 8,792,737 B2 * 7/2014 Lee ...................... H04N 19/119
375/240
9,300,972 B2 * 3/2016 Cheon .................. H04N 19/176
(Continued)

FOREIGN PATENT DOCUMENTS

KR 10-2003-0060009 A 7/2003
KR 10-2009-0115176 A 11/2009
(Continued)

OTHER PUBLICATIONS

C. Zhang, K. Ugur, J. Lainema, A. Hallapuro and M. Gabbouj, "Video Coding Using Spatially Varying Transform," in IEEE Transactions on Circuits and Systems for Video Technology, vol. 21, No. 2, pp. 127-140, Feb. 2011 (Year: 2011).*
(Continued)

*Primary Examiner* — Daniel Chang
(74) *Attorney, Agent, or Firm* — Studebaker & Brackett PC

(57) ABSTRACT

An image encoding device (1) encodes a block-based target image. The image encoding device (1) comprises: a predictor (109) configured to generate a prediction image corresponding to the target image by performing prediction using a plurality of reference images; an evaluator (111) configured to evaluate a degree of similarity between the plurality of reference images on a pixel-by-pixel basis; a calculator (101) configured to calculate a prediction residual indicating a pixel-based difference between the target image and the prediction image; a determiner (112) configured to determine a partial area, to which an orthogonal transform and quantization are to be applied, of the prediction residual based on a result of the evaluation by the evaluator; and a transformer/quantizer (102) configured to perform an orthogonal transform and quantization only for the partial area in the prediction residual.

9 Claims, 9 Drawing Sheets

(51) Int. Cl.
*H04N 19/124* (2014.01)
*H04N 19/167* (2014.01)
*H04N 19/176* (2014.01)
*H04N 19/61* (2014.01)
*H04N 19/91* (2014.01)

(52) U.S. Cl.
CPC ......... *H04N 19/167* (2014.11); *H04N 19/176* (2014.11); *H04N 19/61* (2014.11); *H04N 19/91* (2014.11)

(58) Field of Classification Search
CPC .... H04N 19/182; H04N 19/51; H04N 19/159; H04N 19/132
See application file for complete search history.

(56) References Cited

U.S. PATENT DOCUMENTS

| | | | | |
|---|---|---|---|---|
| 10,516,885 | B1* | 12/2019 | Li | H04N 19/132 |
| 2003/0156648 | A1* | 8/2003 | Holcomb | H04N 19/513 375/E7.199 |
| 2005/0053302 | A1* | 3/2005 | Srinivasan | H04N 19/112 375/E7.184 |
| 2010/0086028 | A1 | 4/2010 | Tanizawa et al. | |
| 2011/0122953 | A1 | 5/2011 | Nakagami et al. | |
| 2012/0099642 | A1* | 4/2012 | Sole | H04N 19/122 375/240.03 |
| 2012/0128074 | A1* | 5/2012 | Zhang | H04N 19/176 375/240.18 |
| 2012/0263237 | A1 | 10/2012 | Koyama et al. | |
| 2012/0263238 | A1 | 10/2012 | Miyoshi et al. | |
| 2013/0039423 | A1* | 2/2013 | Helle | H04N 19/176 375/E7.125 |
| 2017/0353733 | A1* | 12/2017 | Mukherjee | H04N 19/107 |
| 2018/0338144 | A1* | 11/2018 | Nam | H04N 19/149 |
| 2019/0141334 | A1* | 5/2019 | Lim | H04N 19/52 |
| 2019/0149823 | A1* | 5/2019 | Lim | H04N 19/70 375/240.03 |
| 2019/0174131 | A1* | 6/2019 | Abe | H04N 19/157 |
| 2019/0191155 | A1* | 6/2019 | Ko | H04N 19/96 |
| 2020/0007882 | A1* | 1/2020 | Abe | H04N 19/159 |
| 2020/0021810 | A1* | 1/2020 | Li | H04N 19/176 |
| 2020/0177889 | A1* | 6/2020 | Kim | H04N 19/70 |
| 2020/0186838 | A1* | 6/2020 | Zhao | H04N 19/61 |
| 2020/0244976 | A1* | 7/2020 | Zhao | H04N 19/61 |
| 2020/0252610 | A1* | 8/2020 | Zhao | H04N 19/96 |

FOREIGN PATENT DOCUMENTS

| | | | | |
|---|---|---|---|---|
| WO | 2010/010942 A1 | | 1/2010 | |
| WO | WO-2010017837 A1 | * | 2/2010 | ........... H04N 19/147 |
| WO | 2011/080806 A1 | | 7/2011 | |
| WO | 2011/080807 A1 | | 7/2011 | |
| WO | WO-2017222237 A1 | * | 12/2017 | ........... H04N 19/105 |
| WO | WO-2018174402 A1 | * | 9/2018 | ............. H04N 19/18 |
| WO | WO-2019076290 A1 | * | 4/2019 | ........... H04N 19/119 |
| WO | WO-2019164660 A1 | * | 8/2019 | ............. H04N 19/12 |

OTHER PUBLICATIONS

International Telecommunication Union, ITU-T, Telecommunication Standardization Sector of ITU, H-265, Series H: Audiovisual and Multimedia Systems Infrastructure of audiovisual services—Coding of moving video, "High efficiency video coding", Nov. 2019.

Iwamura et al., Description of SOR and HOR video coding technology proposal by NHK and Sharp, Joint Video Exploration Team (JVET) of ITU-T SG 16 WP 3 and ISO/IEC JTC 1/SC 29/WG 11, JVET-J0027_v1, 10th Meeting: San Diego, US, Apr. 2018, pp. i, 1-10.

Andrea Gabriellini et al.; "Spatial transform skip in the emerging high efficiency video coding standard"; 2012 19th IEEE International Conference on Image Processing (ICIP); Sep. 30, 2012; pp. 185-188. IEEE.

Saxena Ankur et al.; "On secondary transforms for Intra BL residue"; JCT-VC meeting; Joint Collaborative Team on Video Coding (JCT-VC) of ITU-T SG16 WP3 and ISO/IEC JTC1/SC29/WG11; 13th Meeting: Incheon, KR; Apr. 18-26, 2013; pp. 1-10.

* cited by examiner

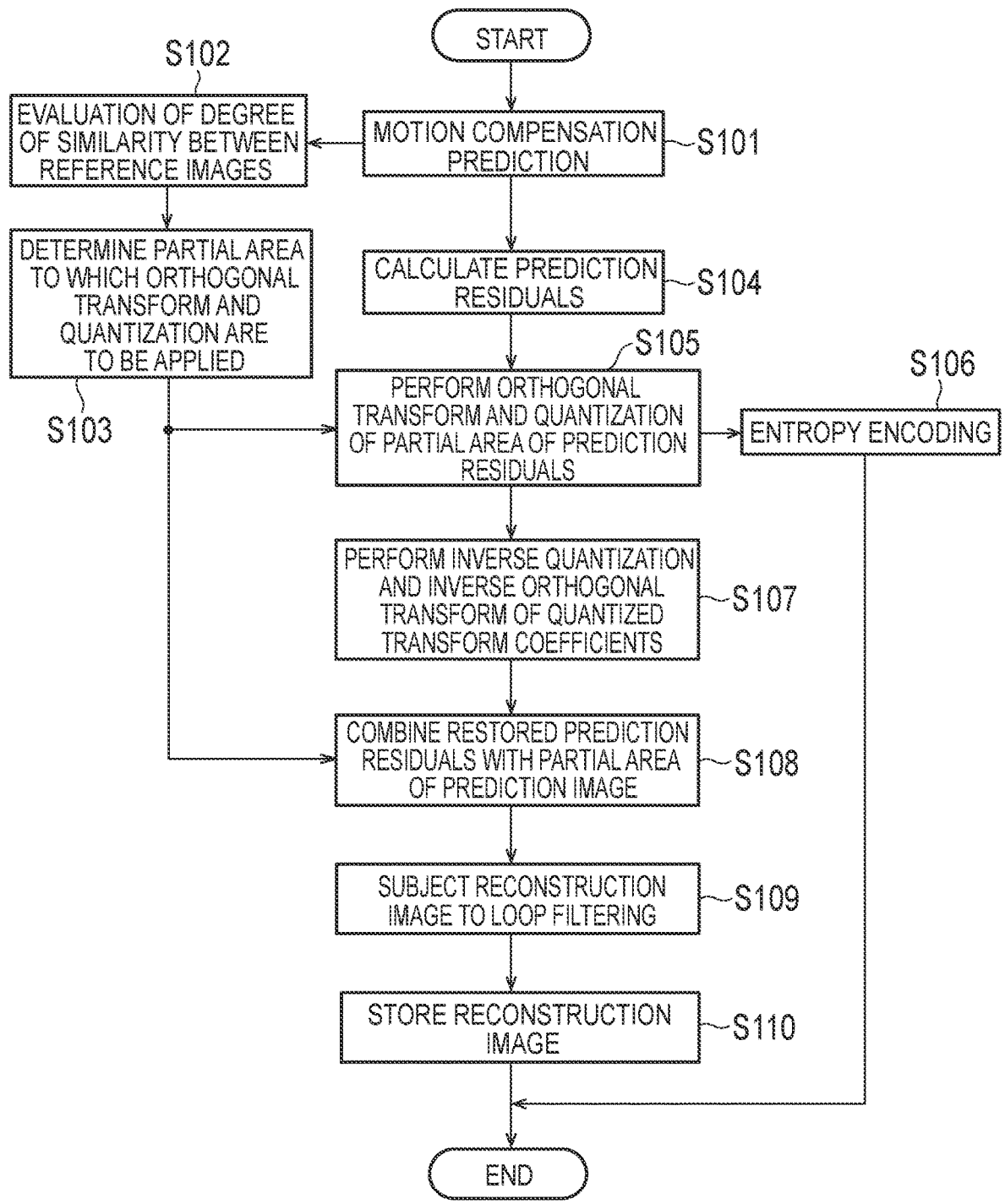

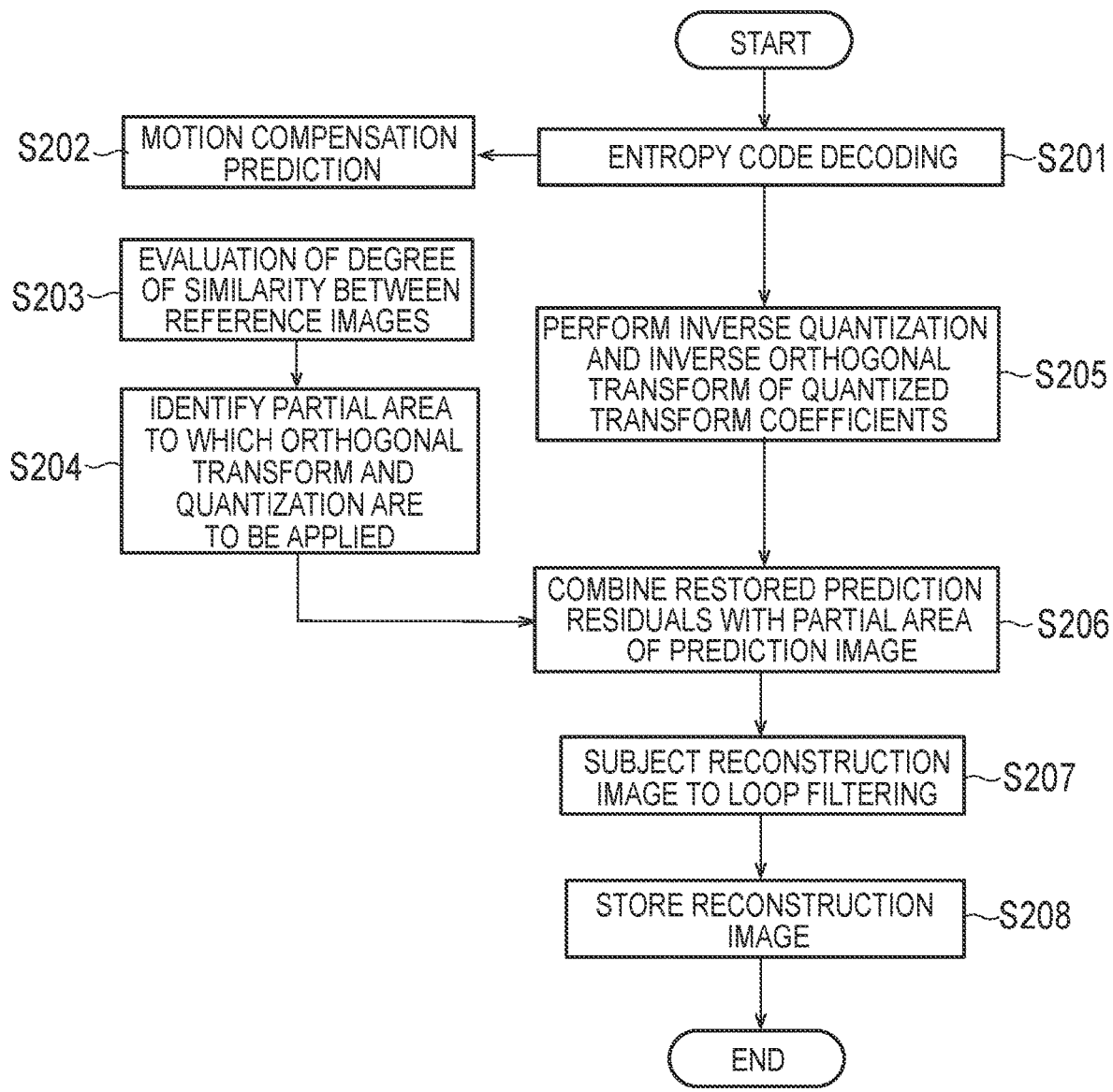

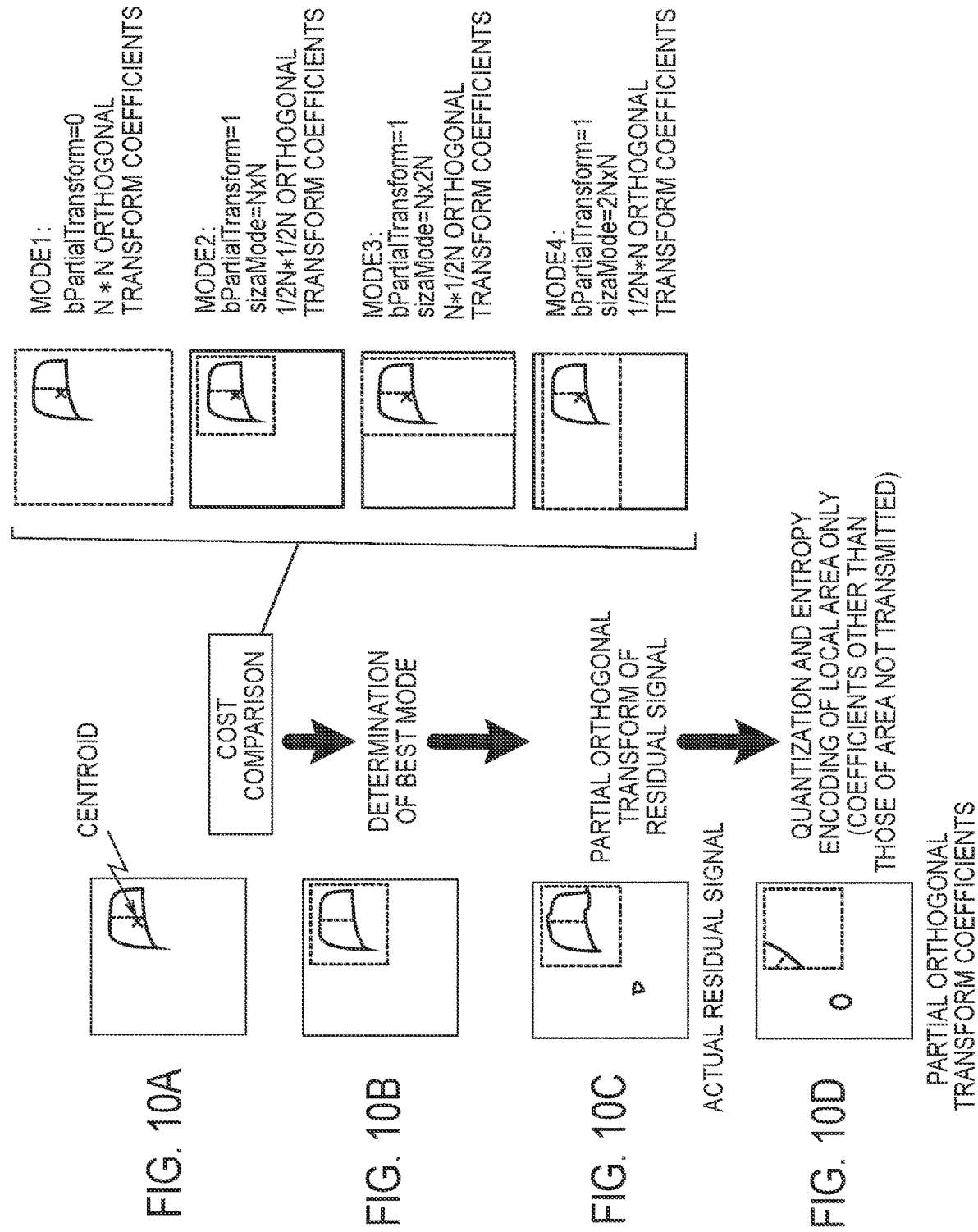

IMAGE ENCODING DEVICE, IMAGE DECODING DEVICE AND PROGRAM

TECHNICAL FIELD

The present invention relates to an image encoding device, an image decoding device and a program.

BACKGROUND ART

A method is known in the art in which an encoding device which encodes a target image (image block), performs motion compensation prediction using a plurality of reference images, generates a prediction image corresponding to the target image, and performs an orthogonal transform and quantization of a prediction residual indicating a difference in a pixel unit between the target image and the prediction image.

Further, the image encoding device entropy encodes quantized transform coefficients obtained through the orthogonal transform and the quantization and restores the prediction residual by performing inverse quantization and an inverse orthogonal transform of the quantized transform coefficients. The image encoding device then reconstructs the target image by synthesizing the restored prediction residual and the prediction image and uses the reconstructed image in subsequent prediction.

Meanwhile, an image decoding device decodes the entropy encoded quantized transform coefficients and performs motion compensation prediction using a plurality of reference images to generate the prediction image corresponding to the target image. The image decoding device restores the prediction residual by performing inverse quantization and an inverse orthogonal transform of the quantized transform coefficients and reconstructs the target image by synthesizing the restored prediction residual and the prediction image.

Such an image encoding device and an image decoding device generate the prediction image by, for example, averaging the plurality of reference images in motion compensation prediction in which the plurality of reference images are used (see Non-Patent Literature 1).

CITATION LIST

Non-Patent Literature

Non-Patent Literature 1: Recommendation ITU-T H.265, (December 2016), "High efficiency video coding", International Telecommunication Union

SUMMARY OF INVENTION

However, when there is a part in which a degree of similarity between a plurality of reference images for generating a prediction image is significantly low, an accuracy (that is, prediction accuracy) of the prediction image in that part is lowered and prediction residuals become large in that part in comparison with the other parts.

Orthogonal transform of the prediction residual between images including a portion with a great prediction residual and a portion with a small prediction residual inhibits energy from being compacted on low frequency components and lowers degree of energy compaction of transform coefficients. If high frequency components of such transform coefficients are roughly quantized, transform coefficients in the high frequency components degrade. Such degradation of the transform coefficients propagates to the whole of the image (block) through inverse quantization and inverse orthogonal transform.

If the target image block is reconstructed by synthesizing the restored prediction residual which degrades in this manner with the prediction image, degradation of image quality also propagates to a portion where prediction has been performed with high accuracy. In other words, there is a problem that, as a result of influence of quantization of the orthogonal transform coefficients propagating to a portion where prediction has been performed with high accuracy, image quality degrades due to a portion where prediction has been performed with low accuracy, which results in degradation of encoding efficiency.

It is therefore an object of the present invention to provide an image encoding device, an image decoding device and a program which are capable of improving encoding efficiency in a case where prediction is performed using a plurality of reference images.

An image encoding device according to a first feature encodes a block-based target image obtained by dividing an input image. The image encoding device comprises: a predictor configured to generate a prediction image corresponding to the target image by performing prediction using a plurality of reference images; an evaluator configured to evaluate a degree of similarity between the plurality of reference images on a pixel-by-pixel basis; a calculator configured to calculate a prediction residual indicating a pixel-based difference between the target image and the prediction image; a determiner configured to determine a partial area, to which an orthogonal transform and quantization are to be applied, of the prediction residual based on a result of the evaluation by the evaluator; and a transformer/quantizer configured to perform an orthogonal transform and quantization only for the partial area in the prediction residual.

Here, for the prediction performed by the predictor, any of various prediction methods can be used regardless of what the prediction method is, as long as such prediction method uses a plurality of reference images. Representative examples of the prediction methods include bidirectional motion compensation prediction, but prediction in an intra BC mode (intra block copy mode), which is used in an HEVC method, may be used.

An image decoding device according to a second feature decodes a block-based target image from encoded data. The image decoding device comprises: a predictor configured to generate a prediction image corresponding to the target image by performing prediction using a plurality of reference images; an evaluator configured to evaluate a degree of similarity between the plurality of reference images on a pixel-by-pixel basis; an entropy decoder configured to decode the encoded data and acquire quantized transform coefficients for a partial area to which an orthogonal transform and quantization have been applied in the image encoding device; and an identifier configured to identify the partial area based on a result of the evaluation by the evaluator.

A program according to a third feature is a program for causing a computer to function as the image encoding device according to the first feature.

A program according to a fourth feature is a program for causing a computer to function as the image decoding device according to the second feature.

The present invention enables provision of an image encoding device, an image decoding device and a program that enable improvement in encoding efficiency in a case where prediction is performed using a plurality of reference images.

BRIEF DESCRIPTION OF DRAWINGS

FIG. 7 is a diagram illustrating an example operation flow in the image encoding device according to the embodiment.

FIG. 8 is a diagram illustrating an example operation flow in the image decoding device according to the embodiment.

FIGS. 10A to 10D include diagrams illustrating example operation in Modification 3 of the embodiment.

DESCRIPTION OF EMBODIMENTS

Figure 1:
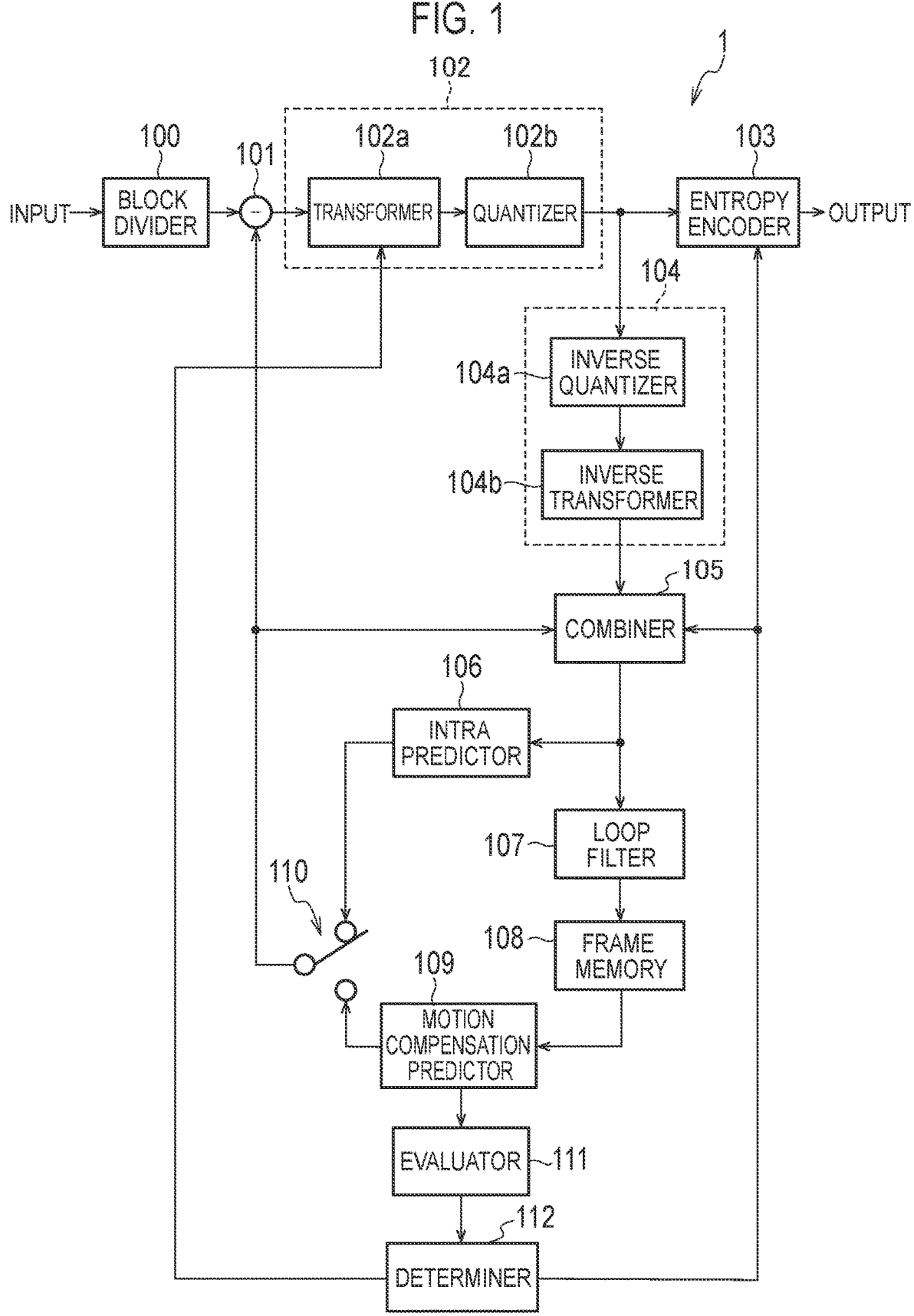
FIG. 1 is a diagram illustrating a configuration of an image encoding device according to an embodiment.

An image encoding device and an image decoding device according to embodiments will be described with reference to the drawings. The image encoding device and the image decoding device according to the embodiments encode and decode a moving image typified by MPEG. The same or similar reference numerals will be assigned to the same or similar portions in the following description of the drawings.

1. Configuration of Image Encoding Device

FIG. 1 is a diagram illustrating a configuration of an image encoding device 1 according to an embodiment. As illustrated in FIG. 1, the image encoding device 1 includes a block divider 100, a subtractor (calculator) 101, a transformer 102a, a quantizer 102b, an entropy encoder 103, an inverse quantizer 104a, an inverse transformer 104b, a combiner 105, an intra predictor 106, a loop filter 107, a frame memory 108, a motion compensation predictor 109, a switcher 110, an evaluator 111 and a determiner 112.

The block divider 100 divides a frame (or a picture)-based input image into small block areas and outputs the image blocks to the subtractor 101 (and the motion compensation predictor 109). The image blocks have a size of, for example, 32×32 pixels, 16×16 pixels, 8×8 pixels or 4×4 pixels. However, a shape of the image blocks is not limited to a square shape but may be a rectangular shape. An image block is a unit for which the image encoding device 1 performs encoding and a unit for which an image decoding device 2 performs decoding, and such image block is referred to as "target image block". Such image block may also be referred to as "coding unit (CU)" or "coding block (CB)".

The subtractor 101 calculates prediction residuals indicating pixel-based differences between a target image block input from the block divider 100 and a prediction image (prediction image block) corresponding to the target image block. More specifically, the subtractor 101 calculates prediction residuals by subtracting respective pixel values of the prediction image from respective pixel values of the target image block, and outputs the calculated prediction residuals to the transformer 102a. Note that the prediction image is input to the subtractor 101 from the later-described intra predictor 106 or motion compensation predictor 109 via the switcher 110.

The transformer 102a and the quantizer 102b form a transformer/quantizer 102 that performs orthogonal transform processing and quantization processing of the prediction residuals. The transformer/quantizer 102 performs an orthogonal transform and quantization not for the prediction residuals at all pixel positions of the target image block but for prediction residuals of a partial area of the target image block. Such partial area is an area in which the prediction residuals are assumedly large and is determined by the determiner 112. In the below, such partial area is referred to as "partial transform block". The partial transform block is a part of the target image block.

The transformer 102a identifies an area of the prediction residuals of the target image block input from the subtractor 101, the area corresponding to the partial transform block, based on information of the partial transform block input from the determiner 112. The transformer 102a extracts prediction residuals of the partial transform block from the prediction residuals input from the subtractor 101, performs an orthogonal transform of the extracted prediction residuals to calculate transform coefficients each indicating an intensity (power) of a spatial-frequency component, and outputs the calculated transform coefficients to the quantizer 102b. Note that the orthogonal transform is, for example, a discrete cosine transform (DCT), a discrete sine transform (DST) or a Karhunen-Loeve transform (KLT).

The quantizer 102b quantifies the transform coefficients of the partial transform block input from the transformer 102a, using a quantization parameter (Qp) and a quantization matrix to generate quantized transform coefficients. The quantization parameter (Qp) is a parameter applied in common to the respective transform coefficients in the block and is a parameter that determines a coarseness of quantization. The quantization matrix is a matrix including, as elements, quantization values for quantifying the respective transform coefficients. The quantizer 102b outputs, e.g., quantization control information and information of the generated quantized transform coefficients to the entropy encoder 103 and the inverse quantizer 104b.

The entropy encoder 103 performs entropy encoding of the partial transform block quantized transform coefficients input from the quantizer 102b, performs data compression to generate encoded data (bit stream) and outputs the encoded data to the outside of the image encoding device 1. For the entropy encoding, e.g., Huffman coding or CABAC (context-based adaptive binary arithmetic coding) can be used. Note that the entropy encoder 103 receives an input of information relating to prediction from the intra predictor 106 and the motion compensation predictor 109, an input of information relating to filtering from the loop filter 107 and an input of information relating to the partial transform block from the determiner 112. The entropy encoder 103 also performs entropy encoding of these pieces of information.

The inverse quantizer 104a and the inverse transformer 104b form an inverse quantizer/inverse transformer 104. The inverse quantizer/inverse transformer 104 restores the partial prediction residual corresponding to the partial transform block by performing inverse quantization and an inverse orthogonal transform of the quantized transform coefficients of the partial transform block input from the quantizer 102b.

The inverse quantizer 104a performs inverse quantization processing corresponding to the quantization processing performed by the quantizer 102b. More specifically, the inverse quantizer 104a restores the transform coefficients by performing inverse quantization of the quantized transform coefficients of the partial transform block input from the quantizer 102b, using the quantization parameter (Qp) and the quantization matrix, and outputs the restored transform coefficients to the inverse transformer 104b.

The inverse transformer 104b performs inverse orthogonal transform processing corresponding to the orthogonal transform processing performed by the transformer 102a. For example, if the transformer 102a performs a discrete cosine transform, the inverse transformer 104b performs an inverse discrete cosine transform. The inverse transformer 104b performs an inverse orthogonal transform of the transform coefficients of the partial transform block input from the inverse quantizer 104a, to restore the partial prediction residual and outputs the restored partial prediction residual to the combiner 105.

The combiner 105 identifies an area of the prediction image input from the switcher 110, the area corresponding to the partial transform block, based on the partial transform block information input from the determiner 112. Then, the combiner 105 reconstructs the target image block by combining the restored prediction residuals (restored partial prediction residual) input from the inverse transformer 104b with the area of the prediction image, the area corresponding to the partial transform block. More specifically, the combiner 105 adds up respective pixel values of the restored partial prediction residual and respective pixel values of the area of the prediction image, the area corresponding to the partial transform block, to reconstruct the target image block. The combiner 105 outputs a reconstruction image that is the reconstructed target image block to the intra predictor 106 and the loop filter 107.

The intra predictor 106 generates an intra-predicted image by performing intra prediction using the reconstructed image input from the combiner 105 and outputs the intra-predicted image to the switcher 110. Further, the intra predictor 106 outputs information of the selected intra prediction mode, and the like, to the entropy encoder 103.

The loop filter 107 performs filtering of the reconstruction image input from the combiner 105, as post-processing, and outputs the reconstruction image subjected to the filtering to the frame memory 108. Also, the loop filter 107 outputs information relating to the filtering to the entropy encoder 103.

The frame memory 108 stores the reconstructed image input from the loop filter 107 in a frame unit.

The motion compensation predictor 109 performs inter prediction using one or more reconstructed images stored in the frame memory 108 as reference images. Specifically, the motion compensation predictor 109 calculates a motion vector using an approach such as block matching, generates a motion compensation prediction image based on the motion vector, and outputs the motion compensation prediction image to the switcher 110. Further, the motion compensation predictor 109 outputs information regarding the motion vector to the entropy encoder 103.

The switcher 110 switches between the intra-predicted image input from the intra predictor 106 and the motion compensation prediction image input from the motion compensation predictor 109, and outputs the prediction image (the intra-predicted image or the motion compensation prediction image) to the subtractor 101 and the combiner 105.

When the motion compensation predictor 109 performs motion compensation prediction using a plurality of reference images, the evaluator 111 evaluates a degree of similarity between the plurality of reference images on a pixel-by-pixel basis and outputs information of a result of the evaluation to the determiner 112. Note that when, e.g., intra prediction (for example, an intra block copy mode) using a plurality of reference images is used and the intra predictor 106 performs prediction using the plurality of reference images, also, the evaluator 111 may perform evaluation of a degree of similarity between the plurality of reference images.

The determiner 112 determines a partial transform block to which an orthogonal transform and quantization are to be applied, based on a result of the evaluation by the evaluator 111. More specifically, the determiner 112 determines a center position of the partial transform block and a size of the partial transform block based on the center position, based on the result of the evaluation by the evaluator 111. The determiner 112 outputs information indicating the determined partial transform block to the transformer 102a and the combiner 105 and outputs information indicating the size of the determined partial transform block (size information) to the entropy encoder 103. Such size information is encoded in the entropy encoder 103 and output as a part of control information included in the encoded data.

2. Configuration of Image Decoding Device

Figure 2:
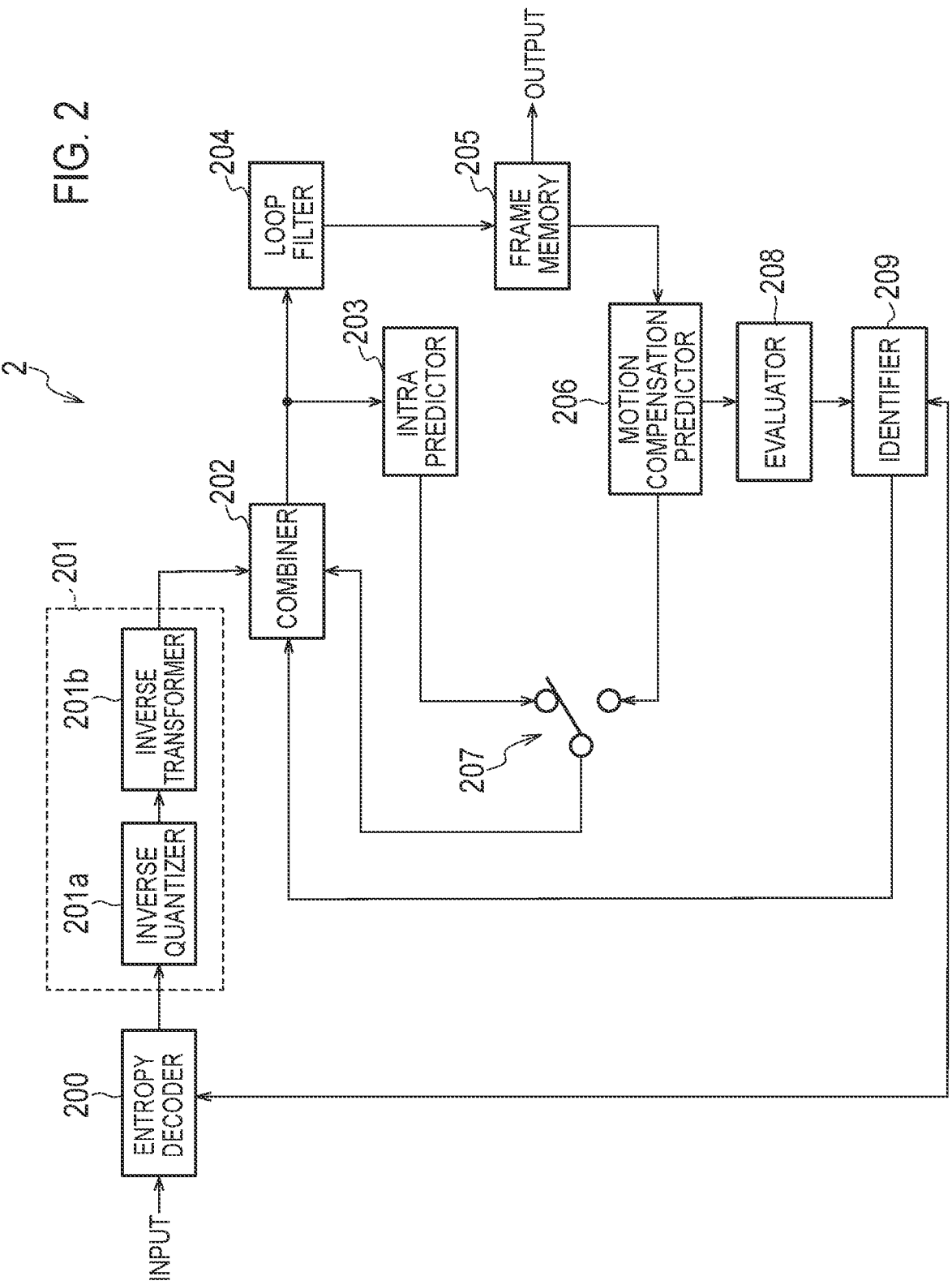
FIG. 2 is a diagram illustrating a configuration of an image decoding device according to the embodiment.

FIG. 2 is a diagram illustrating a configuration of the image decoding device 2 according to the embodiment. As illustrated in FIG. 2, the image decoding device 2 includes an entropy decoder 200, an inverse quantizer 201a, an inverse transformer 201b, a combiner 202, an intra predictor 203, a loop filter 204, a frame memory 205, a motion compensation predictor 206, a switcher 207, an evaluator 208 and an identifier 209.

The entropy decoder 200 decodes the encoded data generated by the encoding device 1 and outputs the quantized transform coefficients for the partial transform block to which the orthogonal transform and the quantization have been applied in the image encoding device 1 to the inverse quantizer 201a. Also, the entropy decoder 200 decodes the encoded data to acquire the information relating to prediction (intra prediction and motion compensation prediction) and the information relating to the filtering. The entropy decoder 200 outputs the information relating to prediction to the intra predictor 203 and the motion compensation predictor 206 and outputs the information relating to the filtering to the loop filter 204. The entropy decoder 200 outputs the size information of the partial transform block to the identifier 209 and the inverse transformer 201b.

The inverse quantizer 201a and the inverse transformer 201b form an inverse quantizer/inverse transformer 201. The inverse quantizer/inverse transformer 201 restores the partial prediction residual corresponding to the partial transform block by performing inverse quantization and an inverse orthogonal transform of the quantized transform coefficients.

The inverse quantizer 201a performs inverse quantization processing corresponding to the quantization processing performed by the quantizer 102b of the image encoding device 1. The inverse quantizer 201a restores the transform coefficients by performing inverse quantization of the quantized transform coefficients of the partial transform block input from the entropy decoder 200, using the quantization parameter (Qp) and the quantization matrix, and outputs the restored transform coefficients to the inverse transformer 201b.

The inverse transformer 201b performs inverse orthogonal transform processing corresponding to the orthogonal transform processing performed by the transformer 102a of the image encoding device 1. The inverse transformer 201b performs an inverse orthogonal transform of the transform coefficients input from the inverse quantizer 201a, based on the size information of the partial transform block input from the entropy decoder 200, to restore the prediction residuals, and outputs the restored prediction residuals to the combiner 202.

The combiner 202 identifies the area of the prediction image input from the switcher 207, the area corresponding to the partial transform block, based on the information of the partial transform block input from the identifier 209. The combiner 202 reconstructs the original target image block by combining the partial prediction residual restored by the inverse transformer 201b with the area of the prediction image, the area corresponding to the partial transform block, on a pixel-by-pixel basis, and outputs the resulting reconstruction image block to the intra predictor 203 and the loop filter 204.

The intra predictor 203 generates an intra-predicted image by performing intra prediction according the intra prediction information input from the entropy decoder 200 with reference to the reconstructed image block input from the combiner 202, and outputs the intra-predicted image to the switcher 207.

The loop filter 204 performs filtering that is similar to the filtering performed by the loop filter 107 of the image encoding device 1, for the reconstruction image input from the combiner 202 based on the filtering information input from the entropy decoder 200, and outputs the reconstruction image subjected to the filtering to the frame memory 205.

The frame memory 205 stores the reconstructed image input from the loop filter 204 in a frame unit. The frame memory 205 outputs the stored reconstructed images to outside of the image decoding device 2 in display order.

The motion compensation predictor 206 generates a motion compensation prediction image by performing motion compensation prediction (inter prediction) according to the motion vector information input from the entropy decoder 200, using one or more reconstruction images stored in the frame memory 205 as reference image(s), and outputs the motion compensation prediction image to the switcher 207.

The switcher 207 switches between the intra-predicted image input from the intra predictor 203 and the motion compensation prediction image input from the motion compensation predictor 206 and outputs the prediction image (the intra-predicted image or the motion compensation prediction image) to the combiner 202.

The evaluator 208 performs operation that is similar to that of the evaluator 111 of the image encoding device 1. More specifically, when the motion compensation predictor 206 performs motion compensation prediction using a plurality of reference images, the evaluator 208 evaluates a degree of similarity between the plurality of reference images on a pixel-by-pixel basis and outputs information of a result of the evaluation to the identifier 209. Note that when, e.g., intra prediction (for example, the intra block copy mode) using a plurality of reference images is used and the intra predictor 203 performs prediction using the plurality of reference images, also, the evaluator 208 may perform evaluation of a degree of similarity between the plurality of reference images.

The identifier 209 identifies the partial transform block to which orthogonal transform and quantization has been applied in the image encoding device 1, based on the result of the evaluation by the evaluator 208. More specifically, the identifier 209 identifies a center position of the partial transform block based on the result of the evaluation by the evaluator 208. Then, the identifier 209 identifies the partial transform block based on the identified center position and the size information input from the entropy decoder 200. The identifier 209 outputs information indicating the identified partial transform block to the combiner 202.

(1.3. Motion Compensation Prediction)

Figure 3:
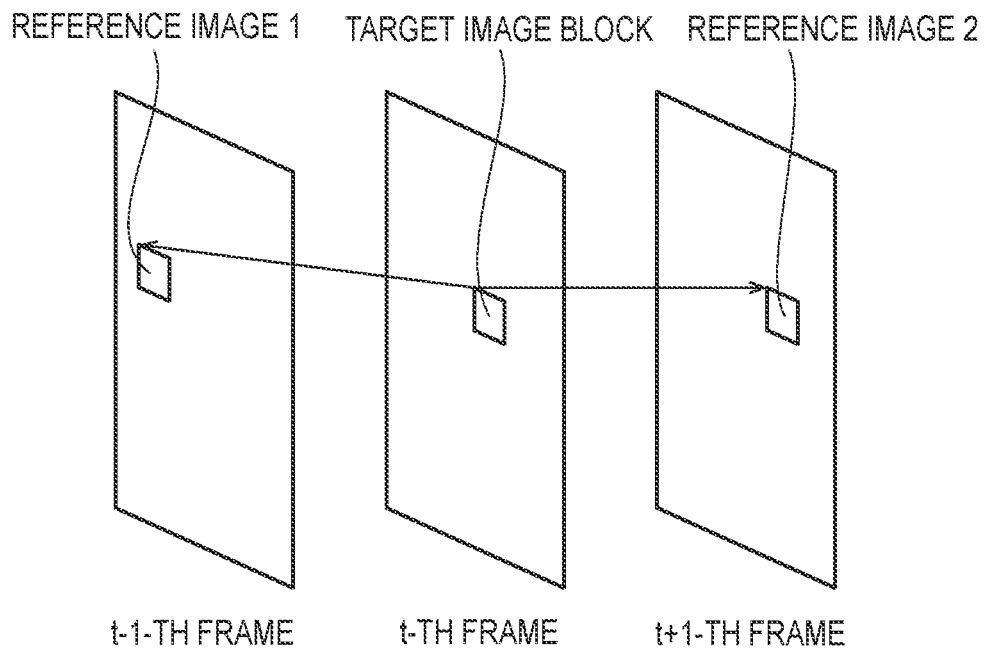
FIG. 3 illustrates an example of motion compensation prediction.
Figure 4:
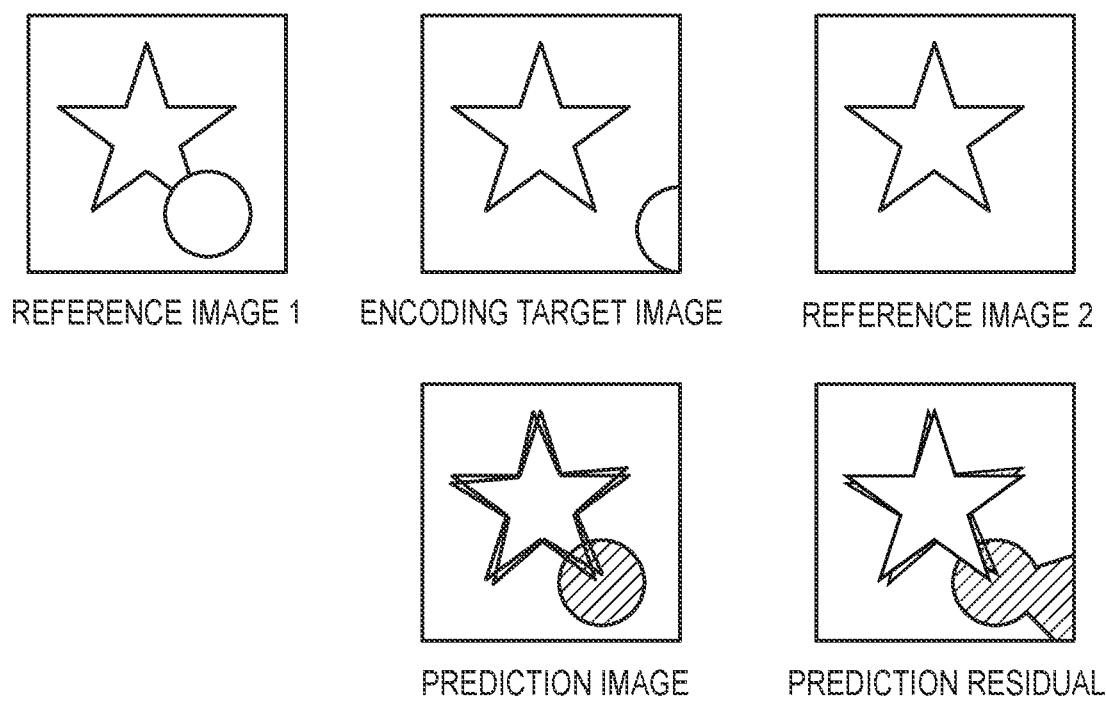
FIG. 4 illustrates an example of a prediction image generated through motion compensation prediction.

FIG. 3 illustrates an example of motion compensation prediction. FIG. 4 illustrates an example of the prediction image generated through motion compensation prediction. A case will be described as a simple example of the motion compensation prediction where bi-prediction used in HEVC, particularly, forward direction and backward prediction (bi-directional prediction) are used.

As illustrated in FIG. 3, the motion compensation prediction is performed with reference to temporally preceding and subsequent frames with respect to a target frame (current frame). In the example in FIG. 3, motion compensation prediction of a block in an image of a t-th frame is performed with reference to a t−1-th frame and a t+1-th frame. In the motion compensation, portions (blocks) within the t−1-th reference frame and the t+1-th reference frame, which are similar to the target image block are detected from a search range set at a system.

The detected portions are reference images. Information indicating relative positions of the reference images with respect to the target image block indicated with an arrow in the drawing, will be referred to as a motion vector. Information of the motion vector is entropy encoded along with the frame information of the reference images at the image encoding device 1. Meanwhile, the image decoding device 2 detects the reference images based on the information of the motion vector generated by the image encoding device 1.

As illustrated in FIGS. 3 and 4, reference images 1 and 2 detected by the motion compensation prediction are similar partial images aligned with the target image block within the respective referred frames, and thus, are images similar to the target image block (encoding target image). In the example in FIG. 4, the target image block includes a design of a star and a design of a partial circle. The reference image 1 includes a design of a star and a design of a whole circle. The reference image 2 includes a design of a start but includes no design of a circle.

A prediction image is generated from reference images 1 and 2. Since prediction processing is processing involving a high processing load, a prediction image is generally generated by averaging reference images 1 and 2. However, a prediction image may be generated using higher-level processing, for example, signal enhancement processing using, e.g., a low-pass filter or a high-pass filter as well. Here, since reference image 1 includes a design of a circle and reference image 2 includes no design of a circle, if a prediction image is generated by averaging reference images 1 and 2, a signal of the design of a circle in the prediction image is reduced to half in comparison with the reference image 1.

A difference between the prediction image obtained from the reference images 1 and 2 and the target image block (encoding target image) is the prediction residual. The prediction residual indicated in FIG. 4 indicates that a large difference exists only at a portion where edges of the stars in the designs are misaligned and at a portion where the circles in the designs are misaligned (shaded portions), and prediction is performed with high accuracy and has less differences at other portions (a difference does not exist in the example in FIG. 4).

A difference does not exist (at a portion which does not correspond to edges of the stars in the designs and at a background portion) at portions where a degree of similarity between the reference image 1 and the reference image 2 is high, and where prediction is performed with high accuracy. Meanwhile, a large difference exists at portions unique to the respective reference images, that is, at portions where the degree of similarity between the reference image 1 and the reference image 2 is significantly low. Thus, it can be known that prediction accuracy is low and a large difference (residual) exists at portions where the degree of similarity between the reference image 1 and the reference image 2 is significantly low.

If a prediction residual in which large difference parts and small difference parts are mixed is orthogonally transformed, energy is not compacted on low-frequency components, resulting in a decrease in degree of energy compaction in the transform coefficients. As a result, degradation of the transform coefficients due to quantization becomes large, and such degradation of the transform coefficients propagates the entire image (target image block) through inverse quantization and an inverse orthogonal transform.

Then, if the target image block is reconstructed by combining the prediction residual (restored prediction residual) restored by inverse quantization and inverse orthogonal transform with the prediction image, degradation of image quality also propagates to portions where prediction has been performed with high accuracy such as a portion which does not correspond to the edges of the stars in the designs and the background portion illustrated in FIG. 4.

In the embodiment, an orthogonal transform and quantization of prediction residuals are performed only for a partial transform block that is a part in which a degree of similarity between reference image 1 and reference image 2 is low (that is, a part in which the prediction residuals are estimated to be large), enabling curbing propagation of degradation of the transform coefficients due to quantization to an area in which the prediction residuals are small in the target image block and thus enabling improvement of image quality.

4. Evaluators in Image Encoding Device and Image Decoding Device

In the image encoding device 1, the evaluator 111 evaluates a prediction accuracy of a prediction image on a pixel-by-pixel basis by calculating a degree of similarity between a plurality of reference images on a pixel-by-pixel basis. Likewise, in the image decoding device 2, the evaluator 208 evaluates a prediction accuracy of a prediction image on a pixel-by-pixel basis by calculating a degree of similarity between a plurality of reference images on a pixel-by-pixel basis.

Figure 5:
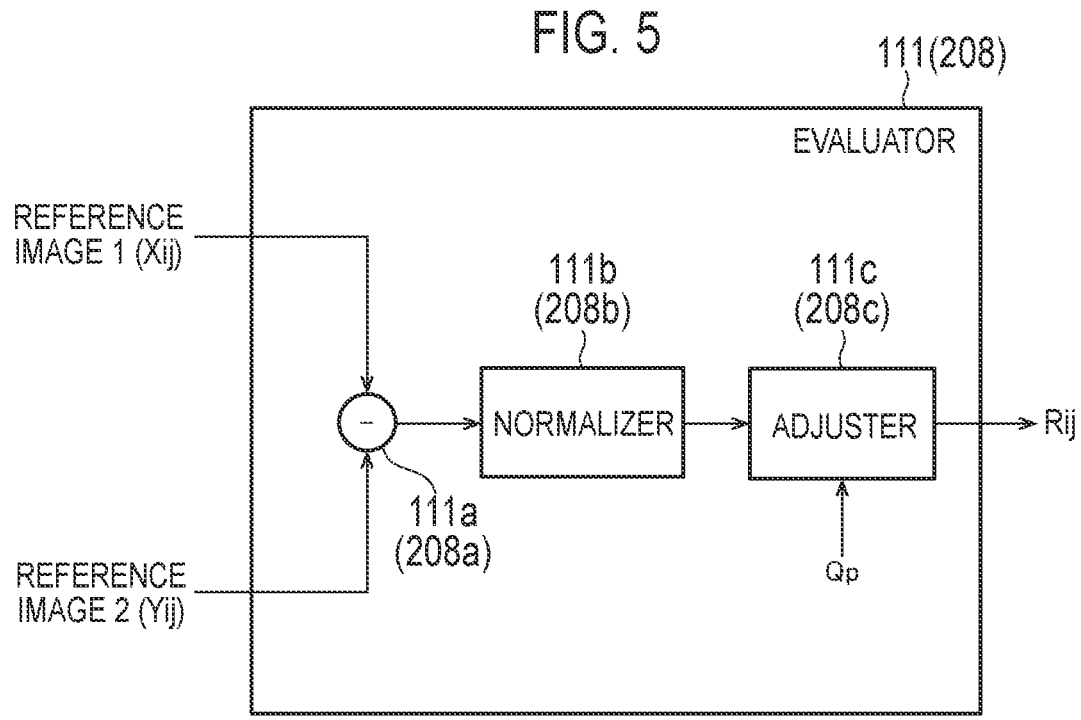
FIG. 5 illustrates an example of a configuration of an evaluator.

FIG. 5 is a diagram illustrating an example of a configuration of the evaluator 111 in the image encoding device 1. As illustrated in FIG. 5, the evaluator 111 includes a difference calculator (subtractor) 111a, a normalizer 111b and an adjuster 111c.

The difference calculator 111a calculates difference values of difference between the reference image 1 and the reference image 2 on a pixel-by-pixel basis and outputs the calculated difference values to the normalizer 111b. Each difference value is an example of a value indicating a degree of similarity. It can be said that as the difference value is smaller, the degree of similarity is higher and as the difference value is larger, the degree of similarity is lower. The difference calculator 111a may calculate the difference values after performing filtering of the respective reference images. The difference calculator 111a may calculate statistics such as square errors and use such statistics as degrees of similarity. In the below, an example in which difference values are used as degrees of similarity will be described.

The normalizer 111b normalizes the difference values input from the similarity degree calculator 111a, using a largest difference value in the block (that is a largest value of the difference values in the block) and outputs the resulting difference values. Each normalized difference value is used as a degree of importance for determining a partial transform block. As the difference value is smaller, the degree of similarity is higher and the prediction accuracy is also higher, and thus, the degree of importance in encoding is low. On the other hand, as the difference value is larger, the degree of similarity is lower and the prediction accuracy is also lower, and thus, the degree of importance in encoding is higher.

The normalizer 111b normalizes the difference values of the respective pixels input from the difference calculator 111a, using a difference value of a pixel, the difference value of which is largest in the block (that is, a largest value of the difference values in the block), and outputs the normalized difference values (degrees of importance).

The adjuster 111c adjusts the normalized difference values input from the normalizer 111b based on the quantization parameter (Qp) that determines a coarseness of quantization, and outputs the adjusted normalized difference values. As the coarseness of quantization is larger, the degree of degradation of the restored prediction residuals is higher, and thus, the adjuster 111c adjusts the normalized difference values (weights) based on the quantization parameter (Qp).

An importance degree Rij of each pixel position (ij) output by the evaluator 111 can be expressed, for example, by Expression (1) below.

$$Rij = (abs(Xij - Yij)/\max D \times \text{Scale}(Qp)) \quad (1)$$

In expression (1), Xij is a pixel value of the pixel ij of the reference image 1, Yij is a pixel value of the pixel ij of the reference image 2, and abs is a function for obtaining an absolute value. The difference calculator 111a illustrated in FIG. 5 outputs abs(Xij−Yij).

Also, in Expression (1), max D is a largest value of difference values abs(Xij-Yij) in a block. In order to calculate max D, it is necessary to calculate a difference value for each of all pixels in the block; however, in order to omit this processing, e.g., a largest value in an adjacent block already subjected to encoding processing may be used instead. Alternatively, max D may be calculated from the quantization parameter (Qp) using a table in which a correspondence relationship between the quantization parameter (Qp) and max D is prescribed. Alternatively, a fixed value prescribed in specifications in advance may be used as max D. The normalizer 111b outputs abs(Xij−Yij)/max D.

Further, in expression (1), Scale(Qp) is a coefficient to be multiplied in accordance with the quantization parameter (Qp). Scale(Qp) is designed so as to approach 1.0 in a case where Qp is greater and approach 0 in a case where Qp is smaller, and a degree of approach is adjusted by a system. Alternatively, it is also possible to use a fixed value defined in specifications in advance as Scale(Qp). Further, to simplify the processing, it is also possible to set a fixed value such as 1.0 designed in accordance with the system as Scale(QP).

The adjuster 111c outputs abs(Xij−Yij)/max D×Scale(Qp) as the importance degree Rij. Also, for the importance degree Rij, a weight adjusted by a sensitivity function designed according to the system may be output. For example, it is possible to set abs(Xij−Yij)/max D×Scale(Qp)=Rij and adjust a sensitivity by setting Rij=Clip(Rij, 1.0, 0.0) or Rij=Clip(Rij+offset, 1.0, 0.0) with an offset. Note that Clip(x, max, min) denotes processing for performing clipping using max if x exceeds max and performing clipping using min if x falls below min.

The importance degree Rij calculated in this way has a value within a range of 0 to 1.0. Basically, the importance degree Rij approaches 1.0 if the difference value of difference at the pixel position ij between the reference images is large (that is, the prediction accuracy is low), and the importance degree Rij approaches 0 if the difference value of difference at the pixel position ij between the reference images is small (that is, the prediction accuracy is high). The evaluator 111 outputs two-dimensional map information including the importance degrees Rij of the respective pixel positions ij in the block to the determiner 112 on a block-by-block basis.

Alternatively, the evaluator 111 may calculate Rij according to Expression (2) below.

$$Rij=1.0-(abs(Xij-Yij)/\max D\times Scale(Qp)) \qquad (2)$$

When Expression (2) is used, Rij approaches 0 if the difference value of the pixel position ij is large (that is, the prediction accuracy is low) and Rij approaches 1 if the difference value of the pixel position ij is small (that is, the prediction accuracy is high). Therefore, Rij can be regarded as a value representing the prediction accuracy (degree of accuracy) of the pixel position ij. In the below, an example in which the evaluator 111 outputs two-dimensional map information including the accuracy degrees Rij of the respective pixel positions ij in the block using Expression (2) will be described, and such map information is appropriately referred to as "accuracy degree map".

Also, the evaluator 208 in the image decoding device 2 is configured like the evaluator 111 in the image encoding device 1. More specifically, the evaluator 208 in the image decoding device 2 includes a similarity degree calculator 208a, a normalizer 208b and an adjuster 208c. The evaluator 208 in the image decoding device 2 outputs an accuracy degree map including the accuracy degrees Rij of the respective pixel positions ij in the block to the identifier 209.

Note that the evaluator 111 and the evaluator 208 perform evaluation (calculation of Rij) only when prediction using a plurality of reference images is applied and need not perform evaluation in another mode, for example, unidirectional prediction or intra prediction processing in which a plurality of reference images is not used.

Note that the evaluator 111 may calculate an error map by means of the below-mentioned method and output the error map to the identifier 209.

When L0[i, j] and L1[i, j] are luminance signals of two reference images (referred blocks) to be used for generating a prediction image in a bi-prediction mode (however, [i, j] are coordinates in the target image block), the evaluator 111 calculates an error map map[i, j] and a largest value max_map thereof according to Expression (3) below.

$$map[i,j]=abs(L0[i,j]-L1[i,j])$$

$$max\#map=\max(map[i,j]) \qquad (3)$$

If max#map in Expression (3) exceeds 6-bit accuracy (exceeds 64), the evaluator 111 updates the error map and the largest value by means of a shift set so as to cause max#map to fall within 6-bit accuracy, according to Expression (4) below.

$$max\#map=max\#map>>shift$$

$$map[i,j]=map[i,j]>>shift \qquad (4)$$

In the error map calculated according to Expression (4), unlike the accuracy degree map, a value of an area in which the prediction residuals are estimated to be large is large and a value of an area in which the prediction residuals are estimated to be small is small. In other words, the above-described normalized accuracy degree map can be calculated by $$\text{accuracy degree } map[i,j]=1-(map[i,j]/max\#map).$$

In the below, the embodiment of the present invention will be described using an error map; however, prediction accuracy may be estimated using an accuracy degree map such as described above.

5. Determiner in Image Encoding Device and Identifier in Image Decoding Device In the image encoding device 1, the determiner 112 determines a center position of a partial transform block and a size of the partial transform block based on the center position, based on a result of evaluation by the evaluator 111. FIG. 6 includes diagrams illustrating an example of operation of the determiner 112.

Figure 6A:
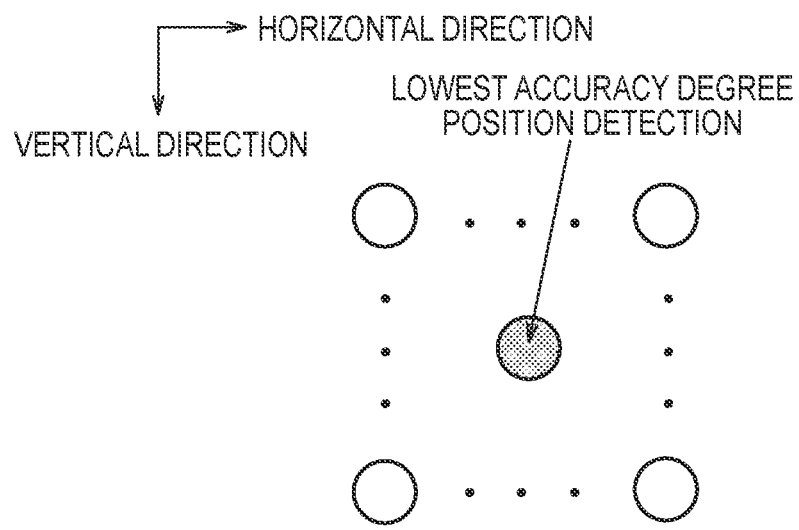
FIGS. 6A and 6B include diagrams illustrating an example of operation of a determiner according to the embodiment.

First, as illustrated in FIG. 6A, the determiner 112 detects a lowest accuracy degree position that is a pixel position at which map[i, j] is largest in an error map input from the evaluator 111, based on the error map, and determines the detected lowest accuracy degree position as a center position. Note that as described above, instead of lowest accuracy degree position detection using an error map, a pixel position at which rij is smallest in an accuracy degree map may be set as a lowest accuracy degree position. Alternatively, instead of determining a lowest accuracy degree position as a center position, the determiner 112 may calculate a centroid of the error map and determine the calculated centroid as a center position.

Figure 6B:
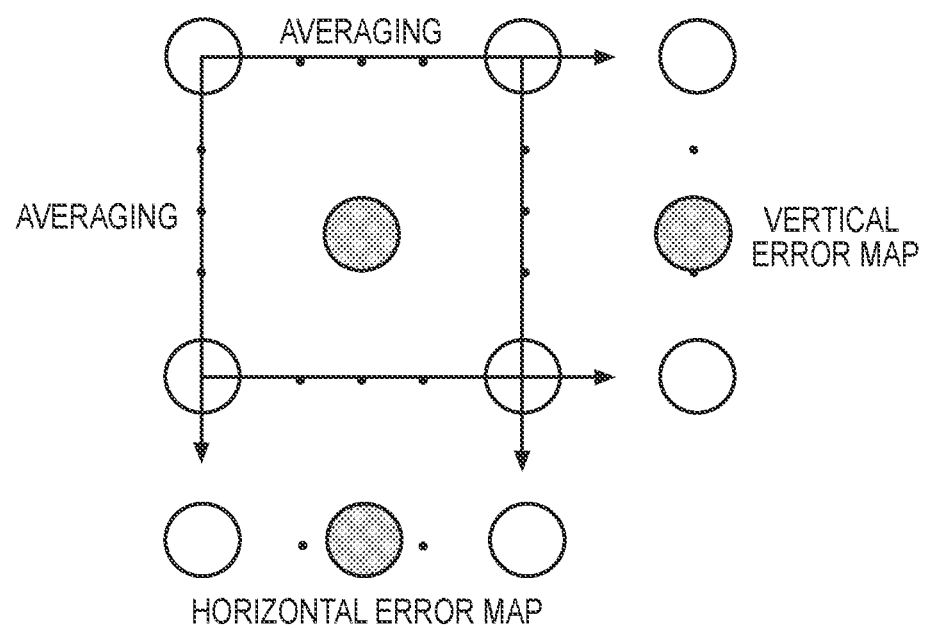

Second, as illustrated in FIG. 6B, the determiner 112 averages the error map in a horizontal direction and a vertical direction to generate a horizontal-direction error map (horizontal error map) and a vertical-direction error map (vertical error map). Then, the determiner 112 expands a range by one pixel for each time with reference to the lowest accuracy degree position in each of the horizontal error map and the vertical error map to determine respective lengths in the horizontal and vertical directions of covering pixel positions at which the degree of accuracy is row, the pixel positions forming X % (for example, 25% or 50%) of the entirety. The determiner 112 may determine a value of X based on a remaining code amount resulting from subtracting a code amount of encoded data encoded prior to the target image block from a target code amount or use a value fixed for the system as X. Also, for a purpose of an increase in speed of the processing, the determiner 112 may determine each of respective lengths in the horizontal and vertical directions of satisfying X % from among lengths of multiples of 2 (e.g., 2, 4, 8 and 16). Determining the horizontal length and the vertical length, respectively, enables not only a square block shape but also a rectangular block shape to be used as a partial transform block.

The determiner 112 outputs the determined center position information and the determined size information (respective lengths in the horizontal and vertical directions) of the partial transform block to the transformer 102a and the combiner 105 and outputs the size information to the entropy encoder 103. The size information is encoded in the entropy encoder 103 and output as a part of control information included in encoded data. Note that the center position of the partial transform block can be identified by the identifier 209 in the image decoding device 2 based on the error map and there is no need to encode the center position information, enabling reduction in code amount.

On the other hand, in the image encoding device 1, the identifier 209 identifies the center position of the partial transform block based on a result of evaluation by the evaluator 208, and identifies the partial transform block based on the identified center position and the decoded size information.

First, the identifier 209 identifies the center position based on the error map by means of a method that is the same as that of the determiner 112 in the image encoding device 1.

Second, the identifier 209 identifies a size (respective lengths in the horizontal and vertical directions) of the target image block based on the size information input from the entropy decoder 200. In this way, the identifier 209 can identify the center position and the size of the partial transform block.

The identifier 209 outputs the identified center position information and the identified size information (respective lengths in the horizontal and vertical directions) of the partial transform block to the combiner 202.

Note that center position candidates may be prescribed in advance in the system. In such case, the determiner 112 and the identifier 209 may determine and identify a detected lowest accuracy degree position or a candidate position closest to a centroid as the center position.

6. Operation of Image Encoding

FIG. 7 is a diagram illustrating an example operation flow in the image encoding device 1 according to the embodiment.

As illustrated in FIG. 7, in step S101, the motion compensation predictor 109 predicts a target image block by performing motion compensation prediction using a plurality of reference images, and generates a prediction image corresponding to the target image block. Motion compensation prediction information is generated in the entropy encoder 103 as a part of encoded data, and the entropy encoder 103 outputs the encoded data including the motion compensation prediction information.

In step S102, the evaluator 111 evaluates a prediction accuracy of the prediction image on a pixel-by-pixel basis by calculating a degree of similarity between the plurality of reference images on a pixel-by-pixel basis, and generates an error map representing a lowness in degree of accuracy of prediction at each pixel position in the target image block.

In step S103, the determiner 112 determines a partial transform block that is a partial area to which an orthogonal transform and quantization are to be applied in the target image block, based on the error map, and provides notification of the determined partial transform block to, and sets the determined partial transform block in, the transformer/quantizer 102 (more specifically, the transformer 102a) and the combiner 105. Also, size information of the partial transform block is encoded in the entropy encoder 103 as a part of encoded data.

In step S104, the subtractor 101 calculates prediction residuals indicating pixel-based differences between the target image block and the prediction image.

In step S105, the transformer/quantizer 102 generates quantized transform coefficients by performing an orthogonal transform and quantization of prediction residuals of the partial transform block in the prediction residuals calculated by the subtractor 101.

In step S106, the entropy encoder 103 performs entropy encoding of the quantized transform coefficients of the partial transform block and outputs the resulting encoded data.

In step S107, the inverse quantizer/inverse transformer 104 restores the prediction residuals of the partial transform block by performing inverse quantization and an inverse orthogonal transform of the quantized transform coefficients of the partial transform block, to generate the restored prediction residuals of the partial transform block.

In step S108, the combiner 105 reconstructs the target image block by combining the restored prediction residuals of the partial transform block with an area of the prediction image, the area corresponding to the partial transform block, on a pixel-by-pixel basis, to generate a reconstruction image block.

In step S109, the loop filter 107 performs filtering of the reconstruction image block. Also, information relating to the loop filter (e.g., information on an offset and a category to which the offset is applied) is encoded in the entropy encoder 103 as a part of the encoded data.

In step S110, the frame memory 108 stores the reconstruction image block subjected to the filtering on a frame-by-frame basis.

7. Operation of Image Decoding

FIG. 8 is a diagram illustrating an example operation flow in the image decoding device 2 according to the embodiment.

As illustrated in FIG. 8, in step S201, the entropy decoder 200 decodes the encoded data to acquire the quantized transform coefficients, motion vector information, the information relating to the loop filter and the size information of the partial transform block.

In step S202, the motion compensation predictor 206 predicts the target image block by performing motion compensation prediction based on the motion vector information using the plurality of reference images, to generate a prediction image corresponding to the target image block.

In step S203, the evaluator 208 evaluates a prediction accuracy of the prediction image on a pixel-by-pixel basis by calculating a degree of similarity between the plurality of reference images on a pixel-by-pixel basis, to generate an error map representing lowness in degree of accuracy of prediction at respective pixel positions in the target image block.

In step S204, the identifier 209 identifies the partial transform block to which the orthogonal transform and the quantization have been applied in the target image block, based on the error map and the size information of the partial transform block, and provides notification of the identified partial transform block to, and sets the identified partial transform block in, the combiner 202.

In step S205, the inverse quantizer/inverse transformer 201 restores the prediction residuals of the partial transform block by performing inverse quantization and an inverse orthogonal transform of the quantized transform coefficients of the partial transform block, to generate the restored prediction residuals of the partial transform block.

In step S206, the combiner 202 reconstructs the target image block by combining the restored prediction residuals of the partial transform block with the area of the prediction image, the area corresponding to the partial transform block, on a pixel-by-pixel basis, to generate a reconstruction image block.

In step S207, the loop filter 204 performs filtering of the reconstruction image block.

In step S208, the frame memory 205 stores and outputs the reconstruction image block subjected to the filtering on a frame-by-frame basis.

8. Summary of Embodiment

The image encoding device 1 according to the embodiment includes: the motion compensation predictor 109 configured to generate a prediction image corresponding to a target image block by performing prediction using a plurality of reference images; the evaluator 111 configured to evaluate a degree of similarity between the plurality of reference images on a pixel-by-pixel basis; the subtractor 101 configured to calculate a prediction residual indicating a pixel-based difference between the target image block and the prediction image; the determiner 112 configured to determine a partial transform block, to which an orthogonal transform and quantization are to be applied, of the prediction residual based on a result of the evaluation by the evaluator 111; and the transformer/quantizer 102 configured to perform an orthogonal transform and quantization only for the partial transform block in the prediction residual.

The image decoding device 2 according to the embodiment includes: the motion compensation predictor 206 configured to generate a prediction image corresponding to a target image block by performing prediction using a plurality of reference images; the evaluator 208 configured to evaluate a degree of similarity between the plurality of reference images on a pixel-by-pixel basis; the entropy decoder 200 configured to decode encoded data and acquire quantized transform coefficients for a partial transform block to which an orthogonal transform and quantization have been applied in the image encoding device 1; and the identifier 209 configured to identify the partial transform block based on a result of the evaluation by the evaluator 208.

According to the embodiment, an orthogonal transform and quantization of prediction residuals can be performed only for a part in which a degree of similarity between reference images to be used for generation of a prediction image is low (that is, a part in which prediction residuals are estimated to be large), enabling improvement in image quality and reduction of a code amount of encoded data. Therefore, encoding efficiency can be improved.

9. Modification 1

The above-described embodiment has been described in terms of an example in which one partial transform block is determined for one target image block. However, a plurality of partial transform blocks may be determined for one target image block.

For example, in the image encoding device 1, the determiner 112 detects, in addition to a lowest accuracy degree position, a pixel position at which a degree of accuracy is second lowest and a pixel position at which the degree of accuracy is third lowest, and determines partial transform blocks with the detected pixel positions as respective centers. In such case, the determiner 112 outputs count information indicating the number of determined partial transform blocks (for example, three) to the entropy encoder 103, and the entropy encoder 103 encodes the count information.

On the other hand, in the image decoding device 2, the entropy decoder 200 decodes the count information from encoded data and outputs the count information to the identifier 209. The identifier 209 identifies the number of partial transform blocks based on the count information and identifies the respective partial transform blocks.

The determiner 112 evaluates respective distances between the detected pixel positions, and determines the respective partial transform blocks in such a manner that the partial transform blocks do not overlap one another. Alternatively, if a detected distance between pixel positions is less than a certain value, the determiner 112 may integrate the plurality of partial transform blocks corresponding to these pixel positions. For example, the partial transform block with the second lowest pixel position as a center is integrated with the partial transform block with the lowest accuracy degree position as a center. In such case, it is possible to further detect a pixel position at which the degree of accuracy is fourth lowest, and add a partial transform block with the detected pixel position as a center.

10. Modification 2

The motion compensation predictor 109 in the image encoding device 1 and the motion compensation predictor 208 in the image decoding device 2 may divide a target image block (CU) into a plurality of small blocks so that different motion vectors can be used for the respective small blocks and switching between unidirectional prediction and bi-prediction may be possible for each small block. In such case, for a CU for which a prediction image is generated using both unidirectional prediction and bidirectional prediction, the evaluator 111 in the image encoding device 1 and the evaluator 208 in the image decoding device 2 may be prevented from calculating an error map. On the other hand, in a case where a prediction image is generated using bi-prediction for each of all the small blocks, the evaluator 111 in the image encoding device 1 and the evaluator 208 in the image decoding device 2 each generate an error map.

Also, for reduction of discontinuity of prediction images at a boundary between blocks having different motion vectors, the motion compensation predictor 109 in the image encoding device 1 and the motion compensation predictor 208 in the image decoding device 2 may perform overlapped block motion compensation (OBMC). In generating an error map, the evaluator 111 in the image encoding device 1 and the evaluator 208 in the image decoding device 2 may take correction of reference pixels by OBMC into consideration.

Figure 9:
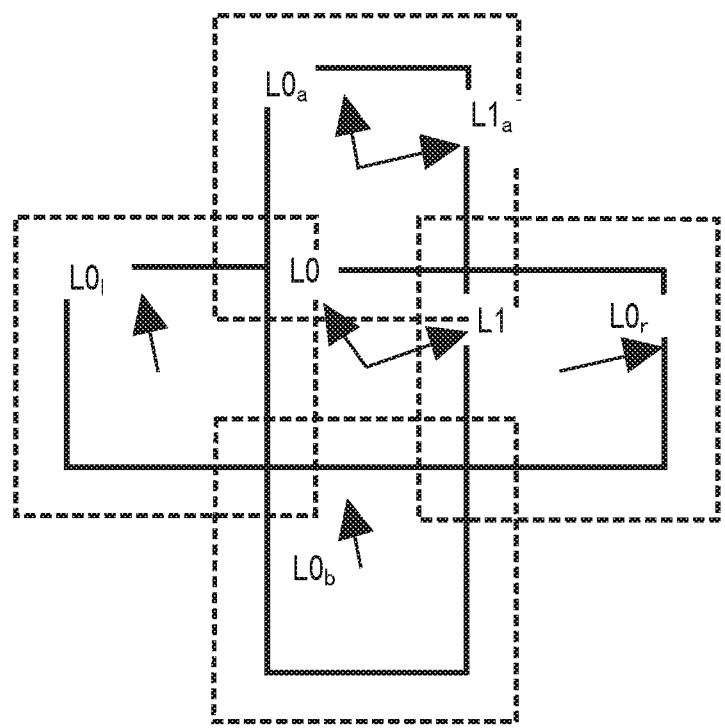
FIG. 9 is a diagram illustrating example operation in Modification 2 of the embodiment.

For example, when a prediction mode for a peripheral block to be used for OBMC is bi-prediction, each of the evaluator 111 in the image encoding device 1 and the evaluator 208 in the image decoding device 2 corrects the relevant error map for an area of the prediction image, the area being affected by correction with the OBMC, using motion vectors of reference images (L0 and L1) to be used for generation of a prediction image for a peripheral block using bi-prediction. More specifically, in a block boundary area in map[i, j], if motion vectors of blocks adjacent to each other are those of bi-prediction, weighted averaging of error maps of the blocks adjacent to each other is performed according to positions. When blocks adjacent to each other are in an intra mode or employ unidirectional prediction, no correction of the error map is performed. In the case in FIG. 9, for the block boundary on the upper side, an error map is generated using L0a and L1a, and for an area below the block boundary (area overlapping the CU), weighted-averaging of the error map and the error map of the CU is performed. A prediction mode of each of the lower, right and left CUs is unidirectional prediction, and no error map correction is performed for areas overlapping these CUs.

11. Modification 3

The determiner 112 in the image encoding device 1 may determine a partial transform block in the below-described method.

For example, when a prediction image is generated for a target image block (CU: coding unit) by means of bi-prediction and a transform skip mode is not applied (that is, an orthogonal transform is applied) to the CU, the determiner 112 determines a partial transform block. Note that a flag of whether or not the transform skip mode is applied is included in encoded data.

FIG. 10 is a diagram illustrating a method for determining a partial transform block in the present modification.

First, as illustrated in FIG. 10A, the determiner 112 calculates a centroid of an error map according to Expression (5) below. Here, for the error map, an error map map[i, j] such as described above is used.

[Math. 1]

$$gx = \frac{\sum_{i,j \in CU} i \cdot \text{map}[i, j]}{\sum_{i,j \in CU} \text{map}[i, j]}, gy = \frac{\sum_{i,j \in CU} j \cdot \text{map}[i, j]}{\sum_{i,j \in CU} \text{map}[i, j]} \quad (5)$$

Here, gx is a centroid position in a horizontal direction and gy is a centroid position in a vertical direction.

Second, as illustrated in FIG. 10B, the determiner 112 selects an optimum size from among size candidates (size modes) of the partial transform block. More specifically, the determiner 112 calculates RD costs when the respective size modes are used and determines an optimum size mode based on the RD costs. In calculation of the RD costs, a signaling cost of transform coefficients and distortion of the entire CU are taken into consideration. The size modes are, for example, the following four modes.

Mode 1: Mode in which a size of the partial transform block is made to be equal to a size of the CU (that is, a mode in which the entire CU is orthogonally transformed).

Mode 2: Mode in which a size in the vertical direction and a size in a horizontal direction of the partial transform block are made to be one-half of those of the CU.

Mode 3: Mode in which the size in the vertical direction of the partial transform block is made to be equal to that of the CU and the size in the horizontal direction of the partial transform block are made to be one-half of that of the CU.

Mode 4: Mode in which the size in the vertical direction of the partial transform block is made to be one-half of that of the CU and the size in the horizontal direction of the partial transform block is made to be equal to that of the CU.

Here, the description will be provided assuming that a mode other than mode 1 is determined and a partial transform block is set. Note that the determiner 112 sets a partial transform block with a center position (gx, gy) as a center so as not to extend across a CU boundary.

Third, as illustrated in FIG. 10C, the transformer 102a performs a partial orthogonal transform of prediction residuals (residual signal) of the partial transform block based on the determined center position and size.

Fourth, as illustrated in FIG. 10D, the quantizer 102b quantizes transform coefficients of the partial transform block and the entropy encoder 103 performs entropy encoding of the quantized transform coefficients.

Also, the entropy encoder 103 causes bPartialTransform, which is a flag indicating whether or not a partial orthogonal transform is applied, and sizeMode, which is information indicating the size of the partial transform block, to be included in encoded data. bPartialTransform is "1" when a partial orthogonal transform is applied and is "0" when no partial orthogonal transform is applied. sizeMode is, for example, "0" in the case of mode 2, is "10" in the case of mode 3 and is "11" in the case of mode 4. Note that in the above RD cost calculation, a cost of such signaling is taken into consideration.

On the other hand, in the image decoding device 2, the entropy decoder 200 decodes the encoded data and acquires the flag of whether or not the transform skip mode is applied. When a prediction image is generated for the decoding target CU by means of bi-prediction and the transform skip mode is not applied (that is, an orthogonal transform is applied) to the CU, the entropy decoder 200 acquires bPartialTransform and sizeMode. Then, the identifier 209 identifies the partial transform block based on the error map generated by the evaluator 208 and sizeMode. The subsequent operation is similar to that of the above-described embodiment.

12. Other Embodiments

The above embodiments have been described using inter prediction mainly for motion compensation prediction. In inter prediction, a reference image in a frame that is different from a current frame is used for prediction of a target image block in the current frame. However, as motion compensation prediction, a technique called "intra block copy" can be employed. In intra block copy, a reference image in a frame that is the same as a current frame is used for prediction of a target image block in the current frame.

The above-described specific examples of the present invention may be provided by a program which causes a computer to execute respective kinds of processing to be performed by the image encoding device 1 and a program which causes a computer to execute respective kinds of processing to be performed by the image decoding device 2. Further, the programs may be stored in a computer readable medium. Use of the computer readable medium allows the programs to be installed onto the computer. Here, the computer readable medium in which the programs are recorded may be a non-transitory recording medium. The non-transitory recording medium is not particularly limited, but for example, a recording medium such as a CD-ROM and a DVD-ROM. Further, circuits which execute respective kinds of processing to be performed by the image encoding device 1 may be integrated to configure the image encoding device 1 as a semiconductor integrated circuit (chip set, SoC). In a similar manner, circuits which execute respective kinds of processing to be performed by the image decoding device 2 may be integrated to configure the image decoding device 2 as a semiconductor integrated circuit (chip set, SoC).

The embodiments have been described in detail above with reference to the drawings. Specific configurations are not limited to the above-described configurations, and various design changes, and the like are possible within the scope not deviating from the gist.

Note that the entire content of Japanese Patent Application No. 2018-65780 (filed on Mar. 29, 2018) is incorporated herein by reference.

The invention claimed is:

1. An image decoding device for decoding a block-based target image from encoded data, the image decoding device comprising:
a predictor circuitry configured to generate a block of a prediction image corresponding to the block of the target image by performing an inter prediction;
an entropy decoder circuitry configured to decode the encoded data and acquire quantized transform coefficients obtained by an image encoding device performing a transformation and a quantization only for a partial area of a block of a prediction residuals; and
an identifier circuitry configured to identify the partial area, wherein the entropy decoder circuitry is configured to
acquire a flag indicating that a partial transform only for the partial area is applied to the block,
acquire a size information flag indicating a size of the partial area of the block of the prediction residuals,
determine that the size of the partial area is one-half of a size of the block in response to the size information flag being set to the first binary value, and
determine that the size of the partial area is one-quarter of the size of the block in response to the size information flag being set to the second binary value.

2. The image decoding device according to claim 1, further comprising:
an inverse quantizer/inverse transformer circuitry configured to restore a partial prediction residual corresponding to the partial area by performing an inverse quantization and an inverse transform of the quantized transform coefficients; and
a combiner circuitry configured to reconstruct the block of the target image by combining the restored partial prediction residual with an area of the block of the prediction image, the area corresponding to the partial area.

3. The image decoding device according to claim 1, wherein:
the entropy decoder circuitry is further configured to acquire a mode information indicating a mode relating to a partial area;
the mode is selected mode, by an image encoding device, from among a plurality of modes; and
the plurality of modes includes:
a mode in which a size in a vertical direction of the partial area is made to be equal to a size of the block and a size in a horizontal direction of the partial area is made to be smaller than the size of the block; and
a mode in which the size in the vertical direction of the partial area is made to be smaller than the size of the block and the size in the horizontal direction of the partial area is made to be equal to the size of the block.

4. The image decoding device according to claim 1, wherein a size of the partial area is one-half or one-quarter of a size of the block.

5. The image decoding device of claim 1, wherein the entropy decoder circuitry is configured to
determine that the partial transform is applied to the block in response to the flag being set to "1", and
determine that the partial transform is not applied to the block in response to the flag being set to "0".

6. The image decoding device of claim 1, wherein the entropy decoder circuitry is configured to
acquire a size information flag indicating a size of the partial area,
determine that the size of the partial area is one-half of a size of the block in response to the size information flag being set to the first binary value, and
determine that the size of the partial area is one-quarter of the size of the block in response to the size information flag being set to the second binary value.

7. The image decoding device of claim 1, wherein the entropy decoder circuitry is configured to
acquire a mode information flag indicating a split direction of the block in obtaining the partial area,
determine that the partial area is obtained by splitting the block horizontally in response to the mode information flag being set to "1", and
determine that the partial area is obtained by splitting the block vertically in response to the mode information flag being set to "0".

8. The image decoding device according to claim 1, wherein:
the entropy decoder circuitry is configured to
determine that the partial transform is applied to the block in response to the flag being set to "1", and
in response to determining that the partial transform is applied to the block, acquire the size information flag indicating the size of the partial area of the block of the prediction residuals.

9. The image decoding device according to claim 1, wherein:
the entropy decoder circuitry is configured to determine that the partial transform is applied to the block in response to the flag being set to in response to determining that the partial transform is applied to the block, acquire the size information flag indicating the size of the partial area of the block of the prediction residuals, and in response to acquiring the size information flag, acquire a mode information flag indicating a split direction of the block in obtaining the partial area.

* * * * *